Aug. 11, 1959     L. P. ATWELL ET AL     2,899,479

SPARK PLUG HAVING PROTRUDING TIP

Filed March 7, 1956

INVENTORS.
GEORGE E. SPAULDING, JR.
LOCKE PAUL ATWELL,
BY JAMES F. ELWELL

Falvey, Souther & Stoltenberg
ATTORNEYS

United States Patent Office 2,899,479
Patented Aug. 11, 1959

2,899,479

SPARK PLUG HAVING PROTRUDING TIP

Locke Paul Atwell, James F. Elwell, and George E. Spaulding, Jr., Toledo, Ohio

Application March 7, 1956, Serial No. 570,107

6 Claims. (Cl. 123—169)

This invention relates to ignition for automotive engines, more particularly to spark plugs for such ignition which cooperate with the inlet valve in the combustion chamber, so that the cool coursing gases entering the combustion chamber through the inlet valve impinge on the firing tip of the spark plug.

The present trend of high powered automobile engine design is in the direction of featuring overhead valves in the combustion chamber including higher compression ratios for improving efficiency which continues to impose demands for suitable fuels on the petroleum industry. The fuels which are presently being produced for these engines contain high concentrations of additives such as, for example, tetraethyl lead. The by-products of the combustion of the fuel and also the additives during operation of the engine deposit themselves on the walls of the combustion chamber and also on the insulator tips of the spark plugs used in connection with ignition. As the engine operating temperature increases, these deposits become electrically conducting, which results in the ignition potential applied to the spark plug leaking away, so that no ignition occurs and the engine will misfire.

The difficulty created by the combustion by-products has been somewhat alleviated by the introduction of other fuel additives such as the highly advertised TPC, ICC, Boron etc. but the problem of fouling the spark plug insulator tip still presents a serious operational problem.

Spark plugs with protruding tips have been utilized in connection with internal combustion engines in the past but have never been successful for the reason that the increased exposure of the electrode material to the high operating temperatures in the combustion chamber, particularly in high compression engines, causes excessive erosion of the electrode material to thereby decrease the effective period of usefulness of the spark plug. For the successful use of spark plugs having insulator tips which protrude deeply into the combustion chamber it is essential that the electrodes be made of an alloy which is highly resistant to the effect of the high temperatures and oxidation as well as corrosive action of the combustion gases to prevent this excessive erosion of the electrodes when used for ignition purposes in the combustion chamber of a modern engine, so that the life expectancy of the spark plug is of sufficient length to satisfy well known commercial requirements.

The selection of a spark plug of a given heat range to provide satisfactory operation of the engine under all driving conditions for modern high-horse-power passenger automobiles is a very difficult problem inasmuch as the engine in normal urban operation utilizes only a small percentage of the horse-power available, so that the operating temperatures in the combustion chamber are relatively low, with the result that a relatively hot spark plug must be used to provide suitable ignition under these driving conditions. The same automobile must also be capable of operating for prolonged periods of time under high speed driving conditions where a relatively high engine output is required, such as is obtained by driving on modern turnpikes. Under these severe driving conditions at high speeds, the relatively hot spark plugs suitable for conditions under normal urban operation would cause engine damage by preignition, whereas, if a spark plug were selected which is suitable to provide optimum performance under the high speed operating conditions, these would accumulate deposits from the combustion by-products under the light load conditions of normal urban operation which would result in an early failure of the spark plug due to excessive fouling.

The present invention contemplates providing a spark plug wherein the tip of the insulator of the spark plug protrudes deeply into the combustion chamber which results in higher temperatures in the spark plug insulator under low speed light load normal urban operation, so that fouling under these conditions is substantially alleviated. When, however, the engine is operated at high speed and high load conditions, such as in turnpike operation, a cooperative relation between the firing tip of the spark plug and the intake valve is provided, whereby the cool incoming gases passing through the intake valve will impinge upon the protruding tip of the spark plug insulator to cool the insulator to result in lower insulator tip temperatures which has the effect of increasing the heat rating of the spark plug to thereby provide more nearly optimum operating conditions over a wider range of driving conditions.

The invention further contemplates the provision of a spark plug wherein the spark gap protrudes a substantial distance into the combustion chamber to provide more nearly the optimum location of the ignition spark to give greater combustion efficiency and better ignition of abnormal fuel mixtures entering the combustion chamber.

The invention further contemplates the provision of a spark plug which is positioned adjacent the intake valve of the engine in the combustion chamber, so that the coursing fuel mixtures which enter the combustion chamber through the intake valve impinge upon the insulator tip protruding into the combustion chamber for the purpose of cooling the insulator tip.

The invention further contemplates the provision of a spark plug which has a tip which protrudes deeply into the combustion chamber of an engine which is provided with electrodes which are made of an alloy which has high heat and corrosion resistance, so that the spark plug is given a life expectancy normally required of spark plugs in commercial use.

It is, therefore, a principal object of this invention to provide a means for igniting fuel charges in a combustion chamber of an engine having overhead valves wherein a spark plug is provided which has a protruding tip positioned in a cooperative relation with the intake valve, so that the fuel mixtures entering the combustion chamber through the intake valve impinge upon the insulator tip.

It is a further object of this invention to provide a spark plug which has a tip which protrudes deeply into the combustion chamber of an engine to improve the combustion efficiency and also to assure the ignition of abnormal fuel mixtures.

It is a further object of this invention to provide a spark plug, suitable for use in the combustion chamber of an engine provided with overhead valves, which cooperates with the intake valve, so that the incoming fuel charges impinge upon the insulator tip of the spark plug to make more effective the optimum operating conditions over wider operating ranges for the engine.

It is a further object of this invention to provide a spark plug which is constructed so that the firing tip of the insulator protrudes deeply into the combustion chamber where it is exposed to the high temperatures of combustion, the firing tip being provided with electrodes made of an alloy having constituents which have high heat and corrosion resistance to give the spark plug a reasonable life expectancy in use under commercial conditions.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
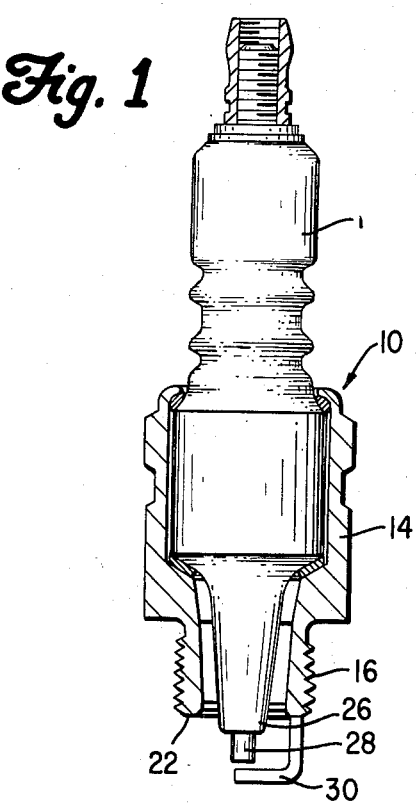
Fig. 1 is a cross sectional view of a spark plug embodying the invention.

Referring to the drawings, particularly to Fig. 1, a spark plug 10 is shown, which consists of an alumina insulator 12 housed in a metallic shell 14 in the well known manner. The shell 14 is provided with a threaded section 16 adapted to fit into a threaded opening 18 (Fig. 4) of a combustion chamber 20 of an internal combustion engine of a high compression type having a compression ratio of about 7.5 to 1. The lower end 22 of the threaded section 16 of the spark plug terminates substantially flush with the upper wall 24 of the combustion chamber, with the firing tip 26 of the insulator 12 protruding a substantial distance into the combustion chamber as is clearly shown.

The insulator 12 is provided with a center electrode 28 which is sealed in the central bore thereof in any convenient manner well known in the art, and which projects from the firing tip 26 of the insulator to cooperate with a side electrode 30 permanently welded on the lower face 22 of the shell 14. As described hereinbefore, these electrodes 28 and 30, which constitute the igniting elements of the spark plug, protrude a substantial distance into the combustion chamber of the engine and are, therefore, fully exposed to the hot coursing gases in the combustion period. During this period the electrodes absorb substantial amounts of heat from the hot gases so that their mean temperatures are raised to high values in each period of combustion while the engine is operating. To withstand these high temperatures without disintegration for a reasonable life expectancy, it has been discovered that these electrodes must have included in them relatively high percentages of heat-resistant metals, such as chromium which gives the electrodes resistance to decomposition and erosion when high temperatures are encountered. The constituents included in these electrode alloys will be further described hereinafter.

Figure 4:
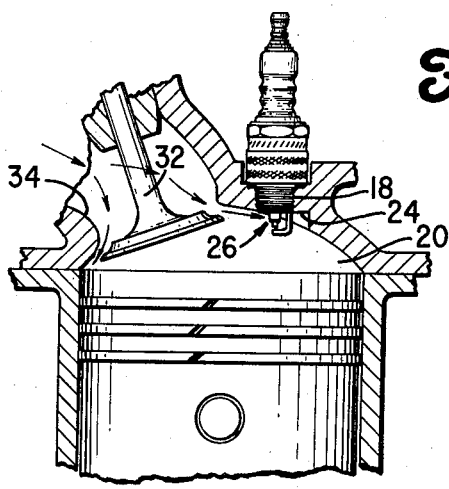
Fig. 4 is a cross sectional view of a combustion chamber showing the relation between the intake valve and the firing tip of the spark plug embodying the invention.

Referring now to Fig. 4, the combustion chamber 20 of the high compression engine may be of the hemispherical type, including overhead valves which operate in the conventional manner. An overhead intake valve 32 is shown in Fig. 4 in the open position during the intake stroke of the operating cycle with arrows indicating the flow of gases in the manifold 34 forming the combustible mixture including hydrocarbon fuels and anti-knock additives such as tetraethyl lead coming from the carburetor (not shown). The arrows show the direction of flow of the incoming cool charges which, due to the opening of the intake valve 32, are directed, in part, toward the protruding insulator tip 26 of the spark plug, against which they impinge to thereby cool the protruding tip so as to prevent over-heating of the spark plug which might cause preignition.

At the low speeds of operation of the internal combustion engine this action is less pronounced than at the high speeds, particularly at open throttle when the engine is operating under heavy load. At high speeds, the periods of time during which the protruding insulator tip 26 is exposed to the hot gases is relatively short, due to the large number of explosions which occur in a given period of time. At the same time, the incoming combustible fuel charges from the manifold 34 are richer and are traveling at a higher rate of speed and are, therefore, more turbulent in their movements which results in more effective cooling of the spark plug from the impingement of the cool incoming fuel charges upon the protruding tip of the spark plug.

For an inherent heat range of a given value for a spark plug, there is a tendency for the spark plug to remain somewhat hotter at the lower speeds of operation of the internal combustion engine, while, at the higher speeds of operation, at which time the heat generated in the combustion chamber is relatively high, the cooling action of the rich, turbulent incoming gases is more effective. The spark plug, therefore, is capable of functioning in a wider operating range in which the spark plug may operate under optimum conditions than is the case where the tip of the spark plug does not protrude into the combustion chamber. It is well known that when the spark plug operates at too low an operating temperature, the by-products of combustion, particularly oxides from the additives, tend to deposit themselves on the insulator of the spark plug and, if the conditions become sufficiently unfavorable, such as tetraethyl lead additions of over one cubic centimeter per gallon of fuel, will cause a conductive deposit to be positioned on the insulator which will eventually short-circuit the plug, so that the ignition voltages will not rise sufficiently to fire the plug due to the electrical leakage across the conducting deposit on the insulator between the center electrode and the shell.

It has long been a problem to manufacture a spark plug which has a suitable heat range to satisfy the operating conditions at low speed to prevent the deposition of by-products of combustion on the insulator of the spark plug and yet, at the same time, is sufficiently cold, so that when the engine is operated at high speeds, the temperature of the insulator will remain sufficiently low so as not to preignite due to the action of the high temperatures. The protrusion of the tip of the spark plug, as disclosed in Fig. 1, when utilized in an engine having overhead valves, as shown in Fig. 4, the cooling effect of the incoming gases forming the combustible mixture have the effect of extending the effective heat range of the spark plug, so that the spark plug operates at a sufficiently high temperature at low speeds to burn off and thereby reduce the deposition of conductive coatings arising from the by-products of combustion, while at the same time, it is cooled sufficiently at high-speed, heavy-load operating conditions so as to maintain the temperature of the spark plug sufficiently low to prevent preignition under the action of high temperatures.

In view of the fact that the firing tip 28 of the center electrode and the cooperating side electrode 30, welded on to the lower side 22 of the shell member 14, are fully exposed to the hot coursing gases during the period of combustion in the combustion chamber 20, they are more likely to absorb large quantities of heat from the hot coursing gases to raise their mean operating temperatures to prohibitive values which cause excessive corrosion in the usual alloys which presently are utilized in fabricating the electrodes. This condition is further aggravated by the fact that the heat absorbed by the exposed electrodes must travel longer conductive paths to be dissipated into the shell 14 and thence into the water jacket which cools the block of the engine. It is, therefore, necessary to make special provision to maintain the operating temperatures of these exposed electrodes at values which are not destructive, or to provide special alloys which have the necessary resistance to heat corrosion and also resistance to spark erosion to give the electrodes sufficient life under normal operating conditions to meet commercial requirements, namely, 10,000 miles of normal operation of the automotive vehicle. It has been found that alloys having a relatively high percentage of nickel, combined with chromium and iron (sometimes with small amounts of aluminum, manganese, silicon, molybdenum and copper) have suitable characteristics to give the exposed electrodes 28 and 30 the necessary resistance to corrosion and oxidation under high temperature and also resistance to spark erosion at the spark gap formed between the electrodes. It has been discovered that the electrode alloys most suitable are set forth in the following table:

| | Nickel, percent | Iron, percent | Chromium, percent | Aluminum, percent | Manganese, percent | Silicon, percent |
|---|---|---|---|---|---|---|
| 1 | 95.5 | | | 4.5 | | |
| 2 | 94.0 | | | 2.0 | 2.5 | 1.0 |
| 3 | 80.0 | | 16.0 | 3.0 | | |
| 4 | 60.0 | | 20.0 | | 20.0 | |
| 5 | 80.0 | | 20.0 | | | |
| 6 | 90.0 | | 10.0 | | | |
| 7 | 76.0 | 8.0 | 15.0 | | | |
| 8 | 76.0 | 7.0 | 15.0 | | 2.0 | |
| 9 | 76.0 | 7.5 | 15.0 | | | 1.5 |
| 10 | 76.0 | 7.0 | 15.0 | 2.0 | | |
| 11 | 76.0 | 5.0 | 15.0 | | 4.0 | |
| 12 | 60.0 | 24.0 | 16.0 | | | |
| 13 | 60.0 | 21.0 | 15.0 | | 4.0 | |
| 14 | 60.0 | 19.0 | 15.0 | 2.0 | 4.0 | |
| 15 | 60.0 | 19.0 | 15.0 | | 4.0 | 2.0 |
| 16 | 60.0 | 17.0 | 15.0 | 4.0 | 4.0 | |
| 17 | 22.5 | 72.0 | | 5.0 | | |
| 18 | 64.0 | 6.0 | 22.0 | {5.0% Molybdenum. 3.0% Copper.} | | |

Figure 3:
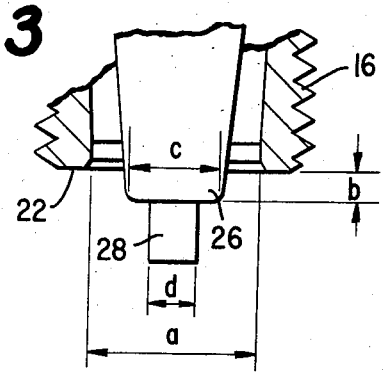
Fig. 3 is a cross sectional view of the firing tip of the spark plug shown in Figs. 1 and 2.

Referring now to Fig. 3, an enlarged view of the firing tip of the spark plug is shown with symbols $a$, $b$, $c$ and $d$ being correlated to the various dimensions shown in the drawing; $a$ indicates the internal bore dimension of the shell with $b$ indicating the dimension of protrusion of the insulator tip from the bottom edge of the shell; $c$ indicates the dimension of the insulator tip diameter and $d$ indicates the diameter of the center electrode protruding from the firing tip of the insulator to provide a spark gap with the side electrode 30.

In order to have a spark plug operate most satisfactorily it has been found that the following proportions must be followed for optimum results:

$\frac{a}{b}$ is between 6.5 and 2.5

$\frac{a}{c}$ is between 2.5 and 1.5

$\frac{c}{b}$ is between 4 and 1

$\frac{c}{d}$ is between 2.5 and 1.75 when these ratios are carried out in a spark plug, the best operating conditions are obtained in a spark plug such as shown in Fig. 1.

Figure 2:
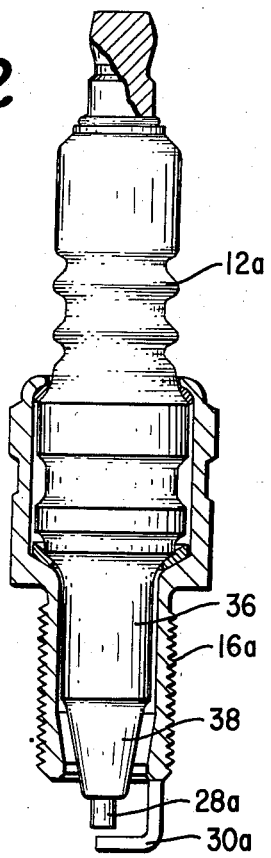
Fig. 2 is a cross sectional view of another type spark plug embodying the invention.

In Fig 2, the invention has been modified and applied to a spark plug having a long reach threaded section 16a, inside of which the insulator 12a is provided with a depending cylindrical portion 36 which is closely associated with the bore of the threaded section 16a to provide for better heat conductivity from the tip portion 38. In other respects the proportions set forth in Fig. 3 are carried out adjacent the firing tip of the spark plug. The heat range on the type of spark plug shown in Fig. 2, by use of the cylindrical depending portions of the insulator, can be made equivalent to that shown in Fig. 1 even though the paths over which the absorbed heat must be conducted are substantially longer. This is due to the fact that substantial heat transfer from the insulator 12a occurs in the locus of the cylindrical depending portion 36 by the closely related wall of the cooperating shell portion. The same alloys are used for the formation of the side electrode 30a and the center electrode 28a, as hereinbefore described, to provide the necessary resistance to heat disintegration and spark erosion at the spark gap formed between these electrode elements.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purpose of description and not of limitation, and it is not intended to limit the scope of the following claims beyond the requirements of the prior art.

What is claimed:

1. In a high compression engine having a combustion chamber fitted with overhead valves adapted for use with hydrocarbon fuels having at least one cubic centimeter per gallon of tetraethyl lead additive, a spark plug including a pair of electrodes, a metallic shell, and an alumina insulator, mounted in the wall of the combustion chamber adjacent the inlet valve characterized by having the insulator tip protruding from the metallic shell into the combustion chamber a distance approximately one fifth the diameter of the internal bore of the shell, said protruding tip being mounted in a manner that it is adapted to be scoured by incoming fuel charges when the inlet valve is opened, and the sparking electrodes for the spark plug characterized by an alloy which has high heat and corrosion resistance.

2. In a high compression engine having a combustion chamber fitted with overhead valves adapted for use with hydrocarbon fuels having at least one cubic centimeter per gallon of tetraethyl lead additive, a spark plug mounted in the wall of the combustion chamber adjacent the inlet valve, including a metallic shell and an alumina insulator having a protruding tip adapted to be scoured by the cool incoming fuel charges impinging thereon when the inlet valve is opened, the dimension of the tip portion of the insulator protruding into the combustion chamber being approximately one fifth the internal diameter of the bore of the shell, and sparking electrodes for the spark plug having high heat and corrosion resistance wherein at least one electrode consists of an alloy having a high percentage of nickel, a smaller percentage of chromium, and the remainder iron.

3. In a high compression engine having a combustion chamber fitted with overhead valves adapted for use with hydrocarbon fuels having at least one cubic centimeter per gallon of tetraethyl lead additive, a spark plug including a metallic shell and an alumina insulator, mounted in the wall of the combustion chamber adjacent the inlet valve, characterized by having the insulator tip protruding from the metallic shell into the combustion chamber a distance approximately one fifth the diameter of the internal bore of the shell, said protruding tip being mounted so that it is adapted to be scoured by the cool incoming fuel charges when the inlet valve is opened, and sparking electrodes for the spark plug characterized by an alloy which has high heat and corrosion resistance wherein at least one electrode consists of an alloy having a high percentage of nickel and a low percentage of aluminum.

4. For use in a high compression engine having a combustion chamber fitted with overhead valves adapted for use with hydrocarbon fuels having at least one cubic centimeter per gallon of tetraethyl lead additive, a spark plug including a pair of electrodes, a metallic shell, and an alumina insulator adapted to be mounted in the wall of the combustion chamber adjacent the inlet valve, characterized by having the insulator tip protruding from the metallic shell and adapted to protrude into the combustion chamber a distance approximately one-fifth the diameter of the internal bore of the shell, said protruding tip adapted to be mounted in a manner to be scoured by incoming fuel charges when the inlet valve is opened, said sparkling electrodes being characterized by an alloy which has high heat and corrosion resistance.

5. For use in a high compression engine having a combustion chamber fitted with overhead valves adapted for use with hydrocarbon fuels having at least one cubic centimeter per gallon of tetraethyl lead additive, a spark plug adapted to be mounted in the wall of the combustion chamber adjacent the inlet valve including a metallic shell and an alumina insulator having a protruding tip adapted to be scoured by the cool incoming fuel charges impinging thereon when the inlet valve is opened, the dimension of the tip portion of the insulator protruding from the shell being approximately one-fifth the internal diameter of the bore of the shell, and sparking electrodes having high heat and corrosion resistance wherein at least one electrode consists of an alloy having a high percentage of nickel, a smaller percentage of chromium and the remainder iron.

6. For use in a high compression engine having a combustion chamber fitted with overhead valves adapted for use with hydrocarbon fuels having at least one cubic centimeter per gallon of tetraethyl lead additive, a spark plug including a metallic shell and an alumina insulator adapted to be mounted in the wall of the combustion chamber adjacent the inlet valve, characterized by having the insulator tip protruding from the metallic shell a distance approximately one-fifth the diameter of the internal bore of the shell, said protruding tip being mounted so that it is adapted to be scoured by the cool incoming fuel charges when the inlet valve is opened, and sparking electrodes characterized by an alloy which has high heat and corrosion resistance wherein at least one electrode consists of an alloy having a high percentage of nickel and a low percentage of aluminum.

References Cited in the file of this patent

UNITED STATES PATENTS

| | | |
|---|---|---|
| 1,892,838 | Horning | Jan. 3, 1933 |
| 1,953,229 | Heron | Apr. 3, 1934 |
| 2,071,645 | McNeil | Feb. 23, 1937 |
| 2,106,578 | Schwartzwalder | Jan. 25, 1938 |
| 2,251,179 | Weinerth | July 29, 1941 |
| 2,266,318 | Heller | Dec. 16, 1941 |
| 2,305,208 | Trammell et al. | Dec. 15, 1942 |
| 2,605,755 | Secrist | Aug. 5, 1952 |

FOREIGN PATENTS

| | | |
|---|---|---|
| 745,016 | Great Britain | Feb. 15, 1956 |